United States Patent [19]

Jessen et al.

[11] 4,156,023

[45] May 22, 1979

[54] METHOD FOR COLORING CHERRIES

[76] Inventors: Karl T. Jessen; Frances M. Jessen, both of R.R. 1, Washington Island, Wis. 54246

[21] Appl. No.: 866,048

[22] Filed: Dec. 30, 1977

[51] Int. Cl.² .......................... A23L 1/275; A23B 7/08
[52] U.S. Cl. .................................. 426/250; 426/540; 426/639
[58] Field of Search ............... 426/102, 103, 250, 540, 426/639

[56] References Cited

U.S. PATENT DOCUMENTS

| | | | |
|---|---|---|---|
| 3,483,002 | 12/1969 | Stein | 426/250 |
| 3,734,747 | 5/1973 | De Felice | 426/250 |
| 3,930,034 | 12/1975 | Shanbhag | 426/250 |

OTHER PUBLICATIONS

Colton, Ed., Old Mr. Boston Deluxe Official Bartender's Guide, Old Mr. Boston Dist. Inc., Boston, Mass., 1963, p.38.

*Primary Examiner*—Jeanette M. Hunter
*Attorney, Agent, or Firm*—Dennis J. Verhaagh

[57] ABSTRACT

A process for the coloring and syruping of cherries by adding to cherries a composition which comprises sugar, carbonated water, syrup, alcohol, FDA approved coloring and flavoring extract, stirring the mixture, sealing and storing at room temperature.

2 Claims, No Drawings

METHOD FOR COLORING CHERRIES

BACKGROUND OF THE INVENTION

This invention relates to a composition for coloring and syruping cherries and, more particularly, it relates to a composition and process for coloring and syruping maraschino cherries.

Maraschino cherries are prepared from sulfited preserved cherries by leaching out preservatives, and then coloring with a certified dye. Leaching with water also removes other water-soluble components such as sugars, natural coloring matter, and flavor, leaving behind a firm, bleached ball consisting mostly of cellulose and pectin. The final process is a matter of coloring with a stable dye and adding flavor and sugar. The finished product is used chiefly for decorative purposes.

Previously, by choosing a combination of dyes, a processor could obtain a particular shade of color which he considered best for the final product. Now, however, the red dyes have been dissallowed by the FDA with the exception of Red No. 3, Red No. 4 and Red No. 40. It is felt by the industry that only two, Red No. 3 and Red. No. 40 are suitable for coloring cherries since other colors do not impart a clear, deep red color to the fruit.

Maraschino cherries are leached, dyed, and syruped. The usual syruping process is stopped when 48 percent sugar is reached in the fruit. The drained cherries are sorted, packed in desired containers, and covered with new sugar solution containing maraschino flavoring and sufficient citric acid to lower the pH. If a preservative is not used, the containers are closed with a vacuum closing machine and sterilized by heating until center temperatures reach 185° F.

The applicants have discovered that a composition can be prepared which allows the use of various dyes all of which are allowed by the FDA. Further, they have discovered a process which does not require the application of heat or refrigeration. Their method represents a great saving of time, convenience, labor and energy over previously available methods of coloring and syruping cherries. This process produces a colored cherry without the shrinkage and shriveling found in other coloring processes.

SUMMARY OF THE INVENTION

The composition product of this invention is obtained by forming a mixture comprised of sugar, carbonated water, syrup, ethyl alcohol, FDA approved coloring, and flavoring extract. This mixture is poured over bleached cherries and allowed to stand for a minimum period of approximately seven days at room temperature and pressure. The cherries will have reached their peak coloring. After that time, a portion of the solution is decanted and a glaze comprised of water, syrup, and sugar is added to the original solution to both glaze and lighten the fruit.

DETAILED DESCRIPTION OF THE INVENTION

The composition of this invention preferably comprises by weight 18 percent to 24 percent sugar, 40 percent to 55 percent carbonated water, 23 percent to 26 percent syrup, 6 percent to 9 percent 100 proof ethyl alcohol, and at least trace amounts of flavoring extract and a water soluble coloring agent (0.1 to 0.5 percent and 0.1 to 0.3 percent, respectively).

Suitable sugars for use in the invention include any of the commonly used sugars as well as mixtures of sugars or artificial sweeteners.

The carbonated water holds more sugar in suspension and drives the coloring in to color the cherry.

Vegetable syrups are preferably used. In particular, light corn syrup has been found to be particularly suited to the invention. The purpose of syrup is to provide a carrier for the coloring and provide additional sweetening and in addition, to add gloss to the cherries to bring out translucent appearance.

Ethyl alcohol is used. A commercial grade of 100 proof alcohol is preferably used because of its availability. However, any proof of alcohol may be used so long as the proportions of alcohol to mixture is maintained. The purpose of alcohol is to break down the coloring and distribute it evenly through the fruit.

The water soluble coloring agent can be any edible dye which dissolves in water, as opposed to colors which are merely dispersed in water. FD&C red No. 3 or red No. 40 are preferably used because of their approval for use by the Food and Drug Administration.

Since desulfurized fruit has most flavoring removed, a flavoring extract is required. The most preferred extract with maraschino cherries is almond extract though other flavoring extracts may also be used.

The most preferred way of making the composition mixture is by mixing about 22 parts of sugar with about 46 parts of carbonated water and stirring thoroughly until the sugar is thoroughly dissolved. Carbonated water is used to maintain the sugar in solution and accelerate its dissolution. While continuing stirring, about 25 parts of syrup is added (preferably light corn syrup), then about 7 parts of 100 proof alcohol and approximately 0.3 parts of food coloring and 0.2 parts of flavoring extract.

The mixture is then poured over bleached cherries in a ratio by weight of about 1 part of fruit to 1 part of the mixture. The batch is then sealed and stored at room temperature for at least 7 days. The cherries will have reached their peak coloring by that time and may be kept in solution for months and used as needed.

The percentages of the ingredients may be varied, though the percentages listed above are preferred for producing cherries of the most appealing color and taste.

The sugar percentage is not crucial, the range of acceptable variance being 22 to 11 percent. The carbonated water has a lessor range of acceptable limits. It has been found that variances between 45 and 55 percent produce acceptable results.

The commercial grade 100 proof alcohol used can range anywhere between 4 and 8 percent but with a substantial increase in coloring time for lesser percentages.

The preferred coloring level is 0.3 percent. A variance to 0.4 percent will result in a darker but acceptable cherry but less than 0.3 percent is not recommended. Extract variances from 0.1 to 0.3 percent do not result in a substantial change in coloring. However, it is recommended that these limits not be exceeded.

The syrup has a range of between 18 and 25 percent with the only change in the fruit being an increase in sweetness.

For the glazing process, a preferred mixture of about 36 parts of sugar and about 7 parts of syrup is mixed with about 57 parts of water. This mixture is boiled for about 4 minutes while stirring and then allowed to cool to room temperature. About one-half to three-quarters of the coloring mixture is decanted and the glaze mixture is added to the batch in the ratio by weight of about 3 parts of fruit to 2 parts of glazing to replace the decanted portion. The batch is resealed and allowed to stand until the fruit reaches the desired color and taste. Depending on the concentration of the alcohol, the most desireable coloring is achieved in about 7 days using 100 proof alcohol.

Once glazed, the cherries are ready for immediate use. However, there may be some coloring loss if the cherries are stored for extended periods. Therefore, if such storage is anticipated, a substitute glazing mixture is recommended to maintain color in the cherries. The following proportions have been found to give the best results in such conditions:

| Ingredient | Grams | Percent |
| --- | --- | --- |
| Water | 1123.1 | 53.4 |
| Sugar | 862.8 | 41.1 |
| Syrup | 113.4 | 5.4 |
| Red food color | 1.4 | .1 |

The sugar portion of the glaze may be decreased to 27 percent with no appreciable change in the mixture's effect. However, a longer boiling time is required. The syrup may vary between 5 and 7 percent and the carbonated water between 57 and 66 percent.

EXAMPLE I

Bleached cherries are colored and glazed to give maraschino cherries by the following examples of the invention:

| Ingredient | Grams | Percent |
| --- | --- | --- |
| Carbonated water | 1261.0 | 45.4 |
| Sugar | 604.8 | 21.8 |
| Syrup | 680.4 | 24.6 |
| 100 Proof Alcohol | 214.6 | 7.7 |
| Red food color | 9.5 | .3 |
| Flavoring extract | 6.0 | .2 |

All mixing is done at room temperature with the ingredients added to the carbonated water in the order set forth while continuously stirring. The mixture is then poured over 2721.6 grams of bleached cherries (1 gallon). This batch is sealed and stored for at least 7 days. Then decant approximately one-half to three-quarters of the mixture and replace with the following glazing mixture:

| Ingredient | Grams | Percent |
| --- | --- | --- |
| Water | 945.8 | 57.1 |
| Sugar | 595.4 | 36.0 |
| Syrup | 113.4 | 6.9 |

This glazing mixture is first boiled for 4 minutes to dissolve the sugar and syrup, then allowed to cool to room temperature before adding to the batch. The cherries will lighten in color and take on a transparent red appearance of the maraschino cherries.

EXAMPLE II

Green maraschino cherries are prepared according to the process and computations of Example I substituting green coloring for red coloring.

Having described in detail the preferred embodiment of the invention, and the manner of practicing the same, it is to be understood to those skilled in the art to which the invention pertains, that many changes, embodiments, and applications will suggest themselves without departing from the scope of the invention. Accordingly, the disclosure and description herein are merely illustrative and not intended to be limiting in any sense.

What is claimed is:

1. A process for coloring cherries comprising (a) adding about 22 parts of sugar with about 46 parts carbonated water, 25 parts of syrup, 7 parts of ethyl alcohol, 0.3 parts of coloring and 0.2 parts of flavoring, (b) stirring the mixture continuously as each ingredient is added, (c) adding the mixture to bleached cherries in a ratio by weight of about 1:1, (d) sealing the mixture, and (e) Store at room temperature until desired color appears.

2. A process for coloring cherries comprising (a) adding from about 18 parts to about 24 parts of sugar with from about 40 parts to about 55 parts of carbonated water, from about 23 parts to about 26 parts of syrup, from about 6 parts to about 9 parts of 100 proof ethyl alcohol, from about 0.1 parts to about 0.3 parts of coloring agent, and from about 0.1 parts to about 0.5 parts of flavoring extract, (b) stirring the mixture continuously as each ingredient is added, (c) adding the mixture to bleached cherries in a ratio by weight of about 1:1, (c) sealing the mixture, and (3) storing at room temperature until desired color appears.

* * * * *